United States Patent [19]

Arimoto

[11] Patent Number: 4,916,747
[45] Date of Patent: Apr. 10, 1990

[54] IMAGE PROCESSING SYSTEM
[75] Inventor: Shinobu Arimoto, Tokyo, Japan
[73] Assignee: Canon Kabushiki Kaisha, Tokyo, Japan
[21] Appl. No.: 205,601
[22] Filed: Jun. 10, 1988

Related U.S. Application Data

[63] Continuation of Ser. No. 31,223, Mar. 27, 1987, abandoned, which is a continuation of Ser. No. 920,917, Oct. 21, 1986, abandoned, which is a continuation of Ser. No. 615,174, May 30, 1984, abandoned.

[30] Foreign Application Priority Data

Jun. 6, 1983 [JP] Japan ................................. 58-99462

[51] Int. Cl.$^4$ ............................................. G06K 9/42
[52] U.S. Cl. ..................................... 382/47; 340/731; 358/451
[58] Field of Search .......................... 382/47; 340/731; 358/287

[56] References Cited

U.S. PATENT DOCUMENTS

| | | | |
|---|---|---|---|
| 3,801,775 | 4/1974 | Acker | 382/61 |
| 4,275,450 | 6/1981 | Potter | 382/47 |
| 4,322,717 | 3/1982 | Iida | 340/731 |
| 4,605,957 | 8/1986 | Yamada | 358/287 |
| 4,672,464 | 6/1987 | Shida | 358/287 |
| 4,679,096 | 7/1987 | Nagashima | 358/287 |
| 4,682,243 | 7/1987 | Hatayama | 382/47 |
| 4,686,580 | 8/1987 | Kato et al. | 358/287 |
| 4,701,808 | 10/1987 | Nagashima | 358/287 |

FOREIGN PATENT DOCUMENTS 2006567 5/1979 United Kingdom .

Primary Examiner—Leo H. Boudreau
Attorney, Agent, or Firm—Fitzpatrick, Cella, Harper & Scinto

[57] ABSTRACT

An image processing system has a line sensor for reading an image, a binarizing circuit for binarizing the read image data, a clock generator for generating a clock for transferring the image data, and a frequency changing circuit for changing the frequency of the clock from the clock generator using a decimal counter (e.g., a DRM) to allow image reproduction of any desired magnification factor without errors.

11 Claims, 5 Drawing Sheets

IMAGE PROCESSING SYSTEM

This application is a continuation of application Ser. No. 031,223 filed Mar. 27, 1987, now abandoned, which is a continuation of application Ser. No. 920,917 filed on Oct. 21, 1986, now abandoned, which is a continuation of application of Ser. No. 615,174 filed on May 30, 1984, now abandoned.

BACKGROUND OF THE INVENTION

1. Field of the Invention

The present invention relates to an image processing system.

2. Description of the Prior Art

A conventional image magnification factor processing system as shown in FIG. 1 is known (Japanese Laid-Open No. 56-137771) which allows magnification factor processing by changing the frequency of clock signals for transferring image data. In this system, the clock signals are interlaced at a predetermined rate so as to change the frequency thereof. A photoelectric image sensor 1 photoelectrically converts light reflected from or transmitted through an original for recording. A binarizing circuit 2 converts an electrical signal or an image signal from the image sensor 1 into an electrical binary signal V. A latch circuit 3 latches the binary signal V. A clock interlace circuit 4 interlaces at a predetermined rate fundamental clock signals $\phi_1$ supplied from a clock generator (not shown). An interlaced signal W from the clock interlace circuit 4 is supplied to the latch circuit 3 and to a memory circuit 5 for controlling input/output of the image in/from the memory circuit 5.

In an image magnification factor processing system having the configuration described above, the clock generator (not shown) constantly supplies the fundamental clock signals $\phi_1$ to the clock interlace circuit 4 and clock signals $\phi_2$ of a different frequency to the binarizing circuit 2.

When an image is to be enlarged, as shown in the timing chart shown in FIG. 2, signals a, c and e of an image signal LV controlled by the interlaced signal W are written at different addresses of the memory circuit 5. These signals are read out (as an image signal MV) by an address counter 6 in accordance with clock signals of a predetermined frequency. When an image is to be reduced in size, the number of clocks to be eliminated from the fundamental clock signals $\phi_1$ by the clock interlace circuit 4 is increased to write a certain proportion of the binary signal V in the memory circuit 5. In this manner, the binary signal V is controlled by the interlaced signal W and its frequency is changed. Since the clock interlace circuit 4 is used, if the phase relationship between the fundamental clock signals $\phi_1$ and the clock signals $\phi_2$ for forming the binary signal V is kept constant, the phase relationship between the interlaced signal W and the binary signal V is also kept constant. Therefore, the write operation into the memory ciricuit 5 is stabilized.

However, although the copying size or magnification factor of an image and the clock interlace circuit 4 hold a close relationship, a means for realizing the magnification factor at a precision in units of 1% has not yet been established. For example, when a magnification factor of 95% is to be realized with a TTL 6-bit binary counter for the clock interlace circuit 4, the clock rate must be set such that a frequency fW of the interlaced signal W satisfies $fW = 0.95 \times f\phi_2$, i.e., $fW = (0.95/2)f\phi_1$ provided that the frequency $f\phi_2$ of the clock signal $\phi_2$ and the frequency $f\phi_1$ of the fundamental clock signal $\phi_1$ hold the relation $f\phi_2 = (\frac{1}{2})f\phi_1$. Therefore, when the binary counter as described above is used, a preset count M satisfying $0.95/2 = M/64$ must be preset as a binary number. From the above relation, M is calculated to be 30.4 in decimal notation. However, since this value cannot be represented as a binary number, M=31 or M=30 is preset. When M is preset to be 31, the actual magnification factor is 96.8%. When M is preset to be 30, the actual magnification factor is preset to be 93.7%. Thus, these magnification factors have errors of +1.8% and −1.3%, respectively, from the target magnification factor.

SUMMARY OF THE INVENTION

It is an object of the present invention to provide an image processing system which is free from the problem associated with conventional image processing systems.

It is another object of the present invention to provide an improvement in an image processing system which is capable of forming an image of a desired magnification factor.

It is still another object of the present invention to provide an image processing system which is capable of forming images with only a small error in magnification factor.

It is still another object of the present invention to provide an image processing system with a simple circuit configuration which can reproduce an image at a desired magnification factor.

It is still another object of the present invention to provide an image processing system wherein a means for changing a frequency of clock signals and so changing a magnification factor of an image comprises a scale of n counter such as a decimal counter, so that a density of image data or magnification factor of an image can be converted at a high precision.

It is still another object of the present invention to provide an improvement in a digital copying machine.

The above and other objects and features of the present invention will become apparent from the following description taken in conjunction with the accompanying drawings.

DETAILED DESCRIPTION OF THE PREFERRED EMBODIMENTS

The preferred embodiment of the present invention will be described with reference to the accompanying drawings.

Figure 1:
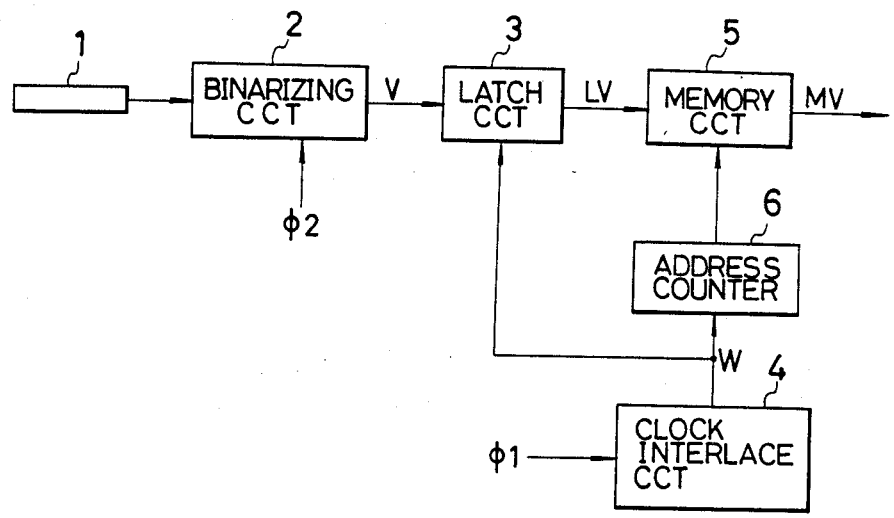
FIG. 1 is a block diagram of a conventional image processing system.
Figure 2:
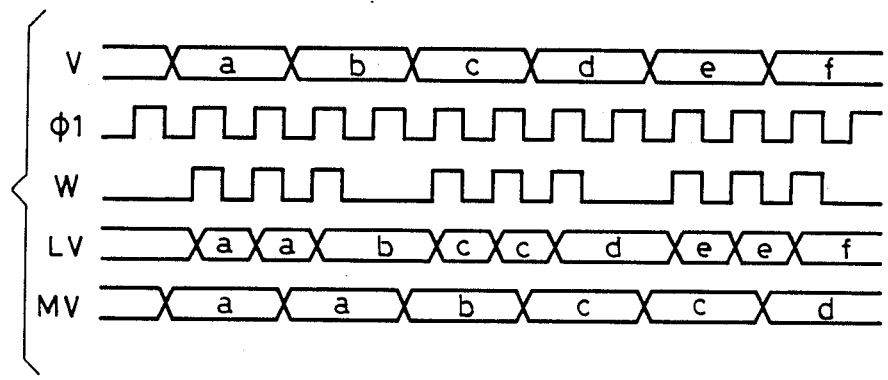
FIG. 2 is a timing chart of the system shown in FIG. 1.
Figure 3:
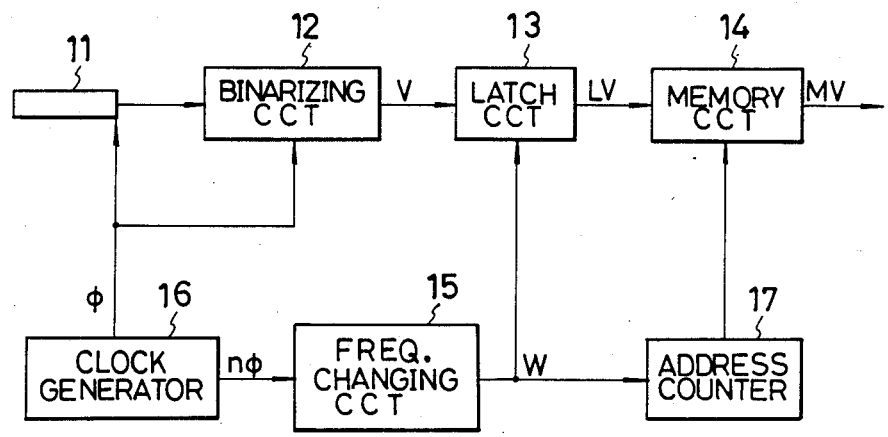
FIG. 3 is a block diagram showing an embodiment of the present invention.

FIG. 3 is a block diagram showing an image processing system according to the present invention. A line sensor 11 photoelectrically changes light reflected from or transmitted through an original into an electrical signal. A binarizing circuit 12 converts the electrical signal from the line sensor 11 into a digital signal (binary image signal) V. A latch circuit 13 latches the image signal V for synchronism with an address signal for writing into a memory circuit 14. A frequency changing circuit 15 serves as a means for interlacing clock signals supplied from a clock generator 16 so as to change the frequency of the clock signals. The frequency changing circuit 15 comprises a decimal counter. An address counter 17 controls input/output of the image signal into or from the memory circuit 14. The memory circuit 14 has, for example, a capacity which is twice that of the data of a read document of one line in the direction of the line sensor 11. Then, an enlargement by a factor of 2 can be performed.

The mode of operation of the system having the above configuration will now be described.

Figure 4:
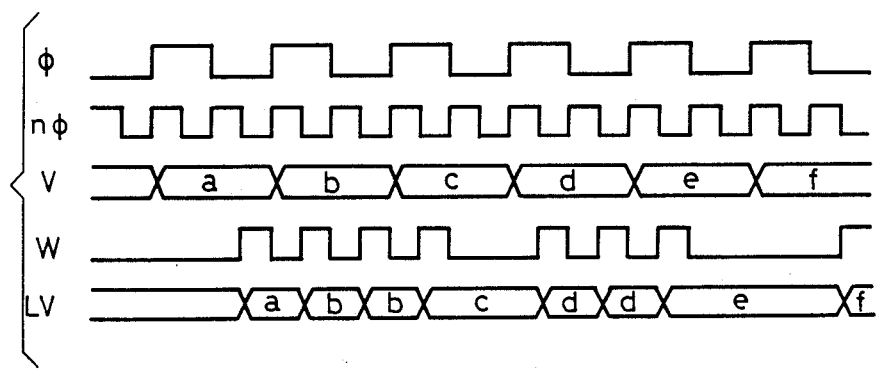
FIG. 4 is a timing chart of the system shown in FIG. 3.

The clock generator 16 generates clock signals $\phi$ for binarizing the image signal and clock signals $n\phi$ to be supplied to the frequency changing circuit 15 and which are synchronous with the clock signals $\phi$. As in the case of the conventional system described above, the magnification factor or copying size of an image is determined by the ratio of the frequency $f\phi$ of the clock signals $\phi$ for converting an image signal from the original into the binary image signal V to the frequency fW of the interlaced signal W produced by the frequency changing circuit 15. FIG. 4 shows the timing chart for this magnification factor processing operation.

Figure 6:
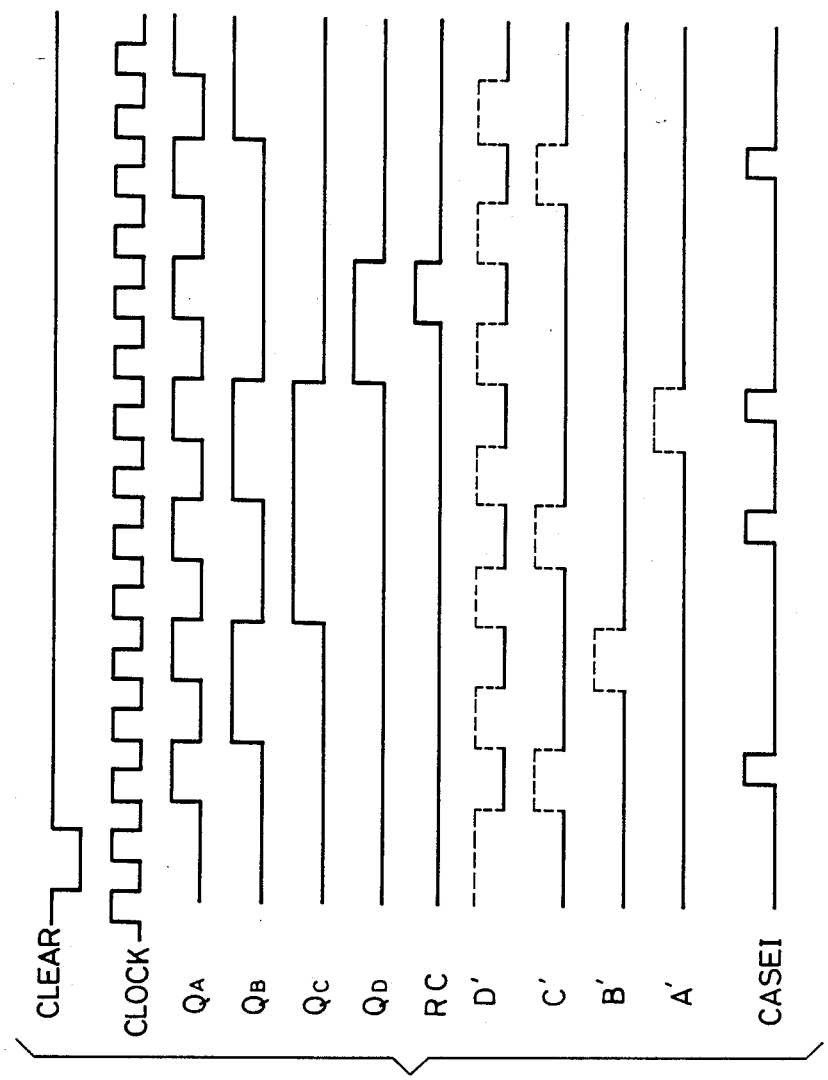
FIG. 6 is a timing chart showing the operation of the frequency changing circuit shown in FIG. 5.
Figure 5:
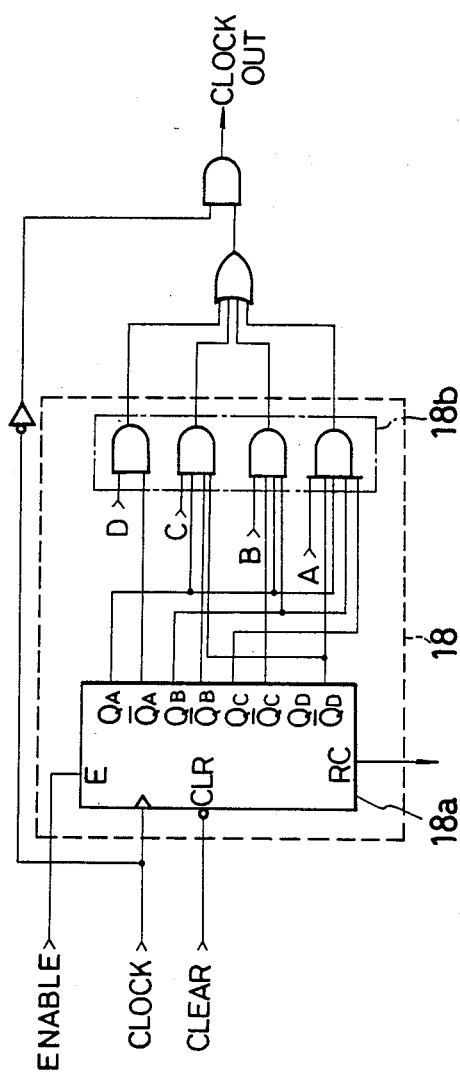
FIG. 5 is a circuit diagram of a frequency changing circuit.

FIG. 5 is a circuit diagram showing the frequency changing circuit 15 when it comprises a decimal counter. A clock rate setter (to be referred to as a DRM 18 hereinafter) comprises a decimal counter 18$a$ and an AND gate setting circuit 18$b$. FIG. 6 is a timing chart showing the operation of the circuit shown in FIG. 5.

The DRM 18 receives at the respective AND gates 18$b$ signals of high (H) level or low (L) level as gate signals A, B, C and D. Clock enable signals A′, B′, C′ and D′ are obtained from combinations of these gate signals A, B, C and D and decoded signals received from output terminals QA, QB, QC and QD of the decimal counter 18$a$.

When the gate signals A, B, C and D are at H level as indicated by the broken lines, the signals A′, B′, C′ and D′ are also at H level. The clock rate is determined in accordance with the gate signals A, B, C and D. For example, when the signals A and C are at H level and the signals B and D are at L level, an output signal of CASE1 (CLOCK OUT) is obtained. In this case, the decimal counter 18$a$ produces 3 output clocks upon counting 10 input clocks. Therefore, the frequency of an output signal from the frequency changing circuit 15 becomes 3/10 that of the original input clock signal. Similarly, when only the signal D is at H level, the frequency of the output signal becomes 5/10 that of the original clock signal. When only the signal C is at H level, the frequency of the output signal becomes 2/10 that of the original clock signal. When only the signal B is at H level, the frequency of the output signal becomes 1/10 that of the original clock signal. When only the signal A is at H level, the frequency of the output signal becomes 1/10 that of the original clock signal. In this manner, in accordance with a combination of the gate signals A, B, C and D, the frequency of the output signal can be changed from 1/10 to 9/10 that of the input clock signal in units of one tenth. Thus, the clock rate becomes $(1/10) \times (5fD + 2fC + 1fB + 1fA)$ (where fA, fB, fC and fD are respectively frequencies of the signals A, B, C and D).

A terminal RC of the decimal counter 18$a$ shown in FIG. 5 is connected to an enable input terminal of the next counter of the cascade-connected counters. The 4-bit decimal counters 18$a$ are connected in a multiple of stages to provide a scale of $R+1$ counter which can count from 0 to R and which constitute the frequency changing circuit 15. When the clock signal for binarizing the image signal is represented by $\phi$ and the clock signal supplied to the DRM 18 is represented by $n\phi$, a preset clock rate S (where $S \leq R$) for a desired magnification factor M (%) is given by:

$$S = M(R+1)/100n \qquad (1)$$

Since the clock rate S is given as an integer, the magnification factor M (%) is set in units of $100n/(R+1)$. When $S = R+1$, the magnification factor M takes a maximum value of 100n (%).

A case will now be described wherein the maximum magnification factor is 200% and the magnification factor M is preset in units of %.

Since the maximum magnification factor is 200%, we have n=2. Therefore, the clock signal supplied to the frequency changing circuit 15 has a frequency which is twice that of the clock signal for binarizing the image signal. Since the magnification factor M is set in units of %, the maximum count R of the counter constituting the frequency changing circuit 15 is 199. The preset clock rate S for the desired magnification M is set such that S=M. Therefore, when the desired magnification factor M is set as a clock rate using a base-200 counter which can count from 0 to 199, enlargement and reduction in size of an image in the main scanning direction can be accurately performed.

Figure 7:
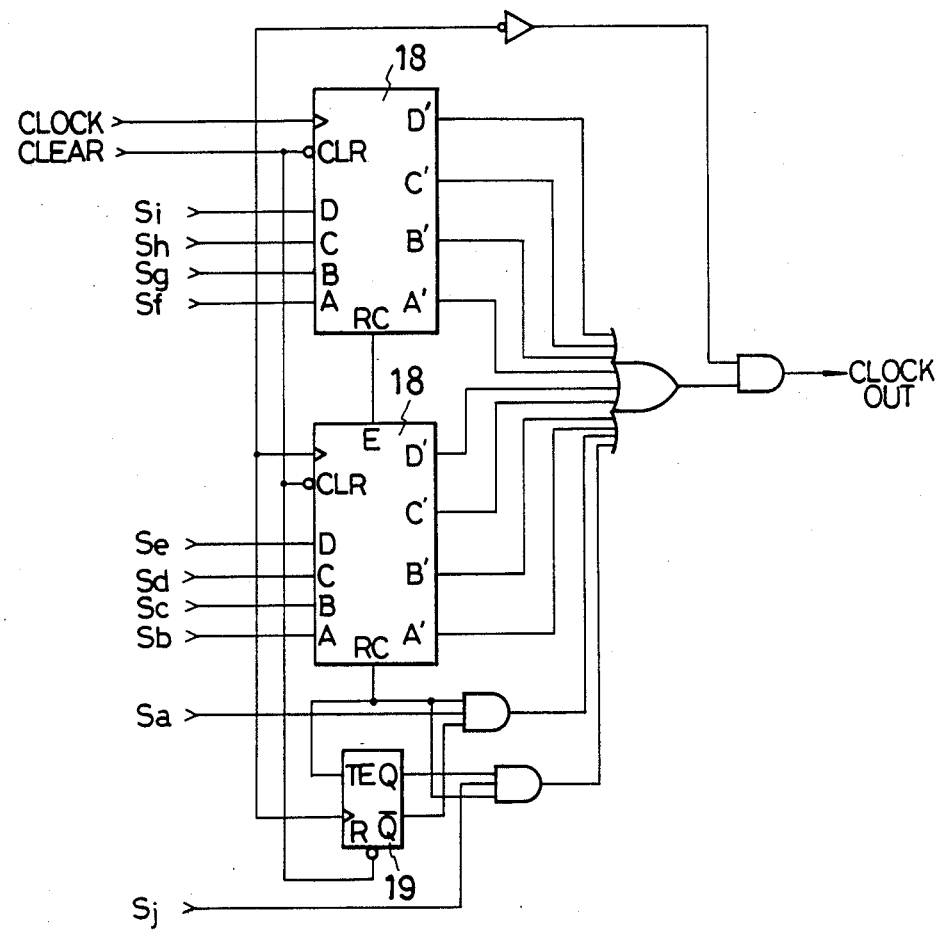
FIG. 7 is a circuit diagram of a frequency changing circuit wherein DRMs are cascaded.

FIG. 7 is a circuit diagram of the frequency changing circuit 15 for the image processing as described above. Two 4-bit DRMs 18, 18 and a toggle enable F/F 19 are cascade-connected so as to constitute a scale of 200 counter which can count from 0 to 199. The circuit shown in FIG. 5 is used as the DRM 18. The preset clock rate is determined by the gate signals supplied from terminals Sa to Si. The proportions of the gate signals are as shown in the table below:

| Si | Sh | Sg | Sf | Se | Sd | Sc | Sb | Sa |
|---|---|---|---|---|---|---|---|---|
| $\frac{100}{200}$ | $\frac{40}{200}$ | $\frac{20}{200}$ | $\frac{20}{200}$ | $\frac{10}{200}$ | $\frac{4}{200}$ | $\frac{2}{200}$ | $\frac{2}{200}$ | $\frac{1}{200}$ |

In accordance with a combination of the gate signals received from the terminals Si to Sa, the clock rate can be set within the range of 0 to 199% magnification. In order to realize a magnification factor of 200%, the input clock can be produced without any change in frequency. However, in the case of a magnification factor of 200%, the signal does not pass through the DRMs 18, and the signal will have a phase advance with respect to the preset clock signal for a magnification factor of 0% to 199% which has passed through the DRMs 18. This phase shift results in a timing shift when the image signal is written in the memory circuit 14. In order to prevent this, one clock signal corresponding to 1% magnification is produced utilizing an output signal from the connecting terminal RC of the cascade-connected scale of 200 counter. Then, the 200% magnification clock rate can be produced without any phase shift from other clock rates. The output of this one clock signal is controlled in accordance with the gate signal from the terminal Sj.

The decimal counter used in the above embodiments is not limited to a counter which can count from 0 to 9. Any counter which can count in decimal notation such that the input clock signal is produced in the same manner for every 10 clock signals and such that a combination of 0 to 9 of the clock enable signals A', B', C' and D' can be obtained from the gate signals can be used.

The binary counter can be replaced with a scale of n counter. In order to allow image production of arbitrary size, a scale of n counter which can count to a count which is an integer multiple of a desired magnification factor or an inverse number thereof must be used.

In order to reduce the size of the reproduced image, the frequency of the clock signal for data write in the memory circuit 14 is made different from that produced from the binarizing circuit 12. In order to enlarge the reproduced image, the clock for data write in the memory circuit 14 is not changed, but the frequency of the clock for reading out from the memory circuit 14 is changed to be different from that of the data input clock in another latch circuit (not shown; interposed between the memory circuit 14 and the printer buffer memory).

In this manner, the frequency of a clock signal can be changed in accordance with a desired magnification factor to give either an enlargement or reduction in size. Therefore, high-frequency clocks need not be used, and the circuit design is simplified.

When an image is to be formed by a printer which has a reproducing density different from the pixel density of the document read data, density conversion of the data (resolution conversion) can be performed by the scale of n counter as described above, thereby obtaining the desired density conversion.

I claim:

1. An image processing system comprising:
   image data input means for inputting image data;
   memory means for storing image data input from said image data input means;
   clock signal generating means for generating a clock signal which serves as a reference clock signal for writing image data in said memory means;
   dividing means for dividing a clock signal from said clock signal generating means to produce a divided clock signal corresponding to a magnification factor; and
   control means for controlling the writing of image data in said memory means in response to the divided clock signal produced by said dividing means,
   wherein said dividing means comprises a counter for counting up to a number R+1 of clock pulses where R+1 is equal to an integer multiple of ten, and said dividing means divides a clock signal from said clock signal generating means into a divided clock signal having clock pulses of period $$\frac{S}{R+1}$$

where S is a value set in accordance with the magnification factor.

2. A system according to claim 1, wherein said image data input means includes means for binarizing data of a read document.

3. A system according to claim 2, wherein said clock signal is in synchronism with a clock signal from said binarizing means.

4. A system according to claim 1, wherein said counter comprises a plurality of decimal counters.

5. A system according to claim 4, wherein S is set in units of percentage.

6. A system according to claim 1, further comprising means for photoelectrically reading the image, wherein said clock signal is in synchronism with a clock signal from said reading means.

7. A system according to claim 6, wherein said clock signal has pulses equal in number to an integer multiple of clock pulses of said reading means.

8. A system according to claim 1, wherein said counter comprises a scale of 200 counter.

9. A system according to claim 1, wherein S is set in units of percentage.

10. A system according to claim 1, wherein said image processing means processes the image data by means of said counter to enlarge or reduce the image.

11. A system according to claim 1, wherein a frequency of a clock signal from said clock signal generating means corresponds to a maximum magnification factor relating to image data written in said memory means.

* * * * *